United States Patent [19]

MacDonald, Jr. et al.

[11] Patent Number: 5,828,343
[45] Date of Patent: *Oct. 27, 1998

[54] ANTENNA CONNECTOR DEVICE FOR A HANDHELD MOBILE PHONE

[75] Inventors: James D. MacDonald, Jr., Apex; Yawei Ma, Cary, both of N.C.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 613,701

[22] Filed: Mar. 11, 1996

[51] Int. Cl.⁶ .................................................. H01Q 1/24
[52] U.S. Cl. .............................. 343/702; 343/906; 455/90
[58] Field of Search ..................... 343/702, 906, 343/872; 455/89, 90; H01Q 1/24

[56] References Cited

U.S. PATENT DOCUMENTS

| | | | |
|---|---|---|---|
| 2,542,884 | 2/1951 | Trebules et al. | 343/906 |
| 3,568,200 | 3/1971 | Seyler | 343/702 |
| 5,255,001 | 10/1993 | Tamura et al. | 343/702 |
| 5,440,315 | 8/1995 | Wright et al. | 343/702 |
| 5,454,734 | 10/1995 | Eggert et al. | 439/578 |
| 5,559,522 | 9/1996 | Seitz | 343/702 |

FOREIGN PATENT DOCUMENTS

| | | |
|---|---|---|
| 0 601 702 A | 6/1992 | European Pat. Off. . |
| 0 508 567 A | 10/1992 | European Pat. Off. . |
| 0 555 933 A | 8/1993 | European Pat. Off. . |
| 3516858 A | 5/1985 | Germany . |

Primary Examiner—Hoanganh T. Le
Attorney, Agent, or Firm—Davidson & Gribbell, LLP

[57] ABSTRACT

A device for connecting the RF signal circuitry of a portable phone and a plurality of antennas utilized to transmit and receive signals is disclosed. The connector device includes a female portion electrically coupled to the RF signal circuitry, with the female portion providing a plurality of ports for electrical coupling with the RF signal circuitry. A complementary male portion is also provided which is electrically coupled to the antennas, the male portion including a separate pin member connected to each antenna. Each pin member of the male portion is received within a corresponding one of the ports in the female portion as the male and female portions of the connector device are mated together. In this way, the RF signal circuitry and the antennas are electrically coupled. The antennas of the portable phone are integrated with a flip cover rotatably mounted to a phone base containing the RF signal circuitry, where the flip cover may be either fixedly or detachably secured to the phone base.

19 Claims, 7 Drawing Sheets

ANTENNA CONNECTOR DEVICE FOR A HANDHELD MOBILE PHONE

BACKGROUND OF THE INVENTION

1. Field of the Invention

The present invention relates generally to a handheld mobile phone and, in particular, to an antenna connector device for such handheld mobile phone which enables it to be connected with one or more antennas associated with the phone or with one or more antennas external to the phone.

2. Description of Related Art

There have been several patent applications filed recently by the assignee of the present invention relating to a portable phone operable in the dual modes of satellite and cellular communication. One of these applications, entitled "Antenna System for Dual Mode Satellite/Cellular Portable Phone," Ser. No. 08/586,433, discloses a portable phone in which the antennas for transmitting and receiving signals are located within a flip cover, where the flip cover is rotatably mounted to a phone base or main housing about two separate axes. In this way, the antennas may be positioned so as to optimize link margin with an applicable satellite. It will be understood that the antennas therein are directly connected to the RF signal circuitry (located in the phone base) by means of coaxial cables or other similar means.

Alternatively, a patent application entitled "Detachable Flip Cover Assembly for a Portable Phone," Ser. No. 08/586,434, discloses a portable phone in which a flip cover is detachably secured to the phone base by means of a support bracket assembly. It will be noted that the detachable flip cover therein is also rotatable about two separate axes with respect to the phone base to optimize link margin between antennas integrated with the flip cover and an applicable satellite. In this configuration, individual connectors are provided to couple the antennas in the flip cover with the RF signal circuitry located in the phone base. Similar connectors may also be provided in external docking stations and other accessories so that the portable phone is able to utilize the antennas integrated with such docking stations when the flip cover is detached from the phone base.

While the aforementioned manners of coupling the antennas are satisfactory for their intended purpose, it has been found that separate and independent connectors require a significant amount of area along a surface of the phone base housing. Accordingly, the center contact pins of such connectors have been relatively small in size and required some degree of movement to assure proper alignment. The mechanical and electrical performance of these connectors has therefore suffered to some degree.

Further, it has also been found that a portable phone positioned within a docking station generally incurs spacing concerns due to any fixed antennas associated with the portable phone (e.g., as with that described in Ser. No. 08/586,433 above). Of course, this is not a concern for portable phones having antennas which are detachable (e.g., as with that described in Ser. No. 08/586,434 above). Nevertheless, it is highly desirable that any connector design utilized be compatible with both situations.

In light of the foregoing, a primary objective of the present invention is to provide a device for connecting the RF signal circuitry of a portable phone and the antennas thereof which maximizes mechanical and electrical performance.

Another object of the present invention is to provide a compact device for connecting the RF signal circuitry of a portable phone and the antennas thereof.

A further object of the present invention is to provide a device for connecting the RF signal circuitry of a portable phone and the antennas thereof which permits the use of larger center contact pins and thereby reduces the degree of movement required of such center contact pins.

Yet another object of the present invention is to provide a device for connecting the RF signal circuitry of a portable phone and the antennas thereof when the antennas are integrated with a flip cover rotatably mounted to the phone base.

Still another object of the present invention is to provide a device for connecting the RF signal circuitry of a portable phone and the antennas thereof when the antennas are integrated with a flip cover rotatably mounted to and detachable from the phone base.

Another object of the present invention is to provide a device for selectively connecting the RF signal circuitry of a portable phone with the antennas thereof or the antennas of an external docking station.

A still further object of the present invention is to provide a device for selectively connecting the RF signal circuitry of a portable phone with the antennas thereof or the antennas of an external docking station, where the device may be mounted in a variety of locations on the phone base.

These objects and other features of the present invention will become more readily apparent upon reference to the following description when taken in conjunction with following drawing.

SUMMARY OF THE INVENTION

In accordance with one aspect of the present invention, a device for connecting the RF signal circuitry of a portable phone and a plurality of antennas utilized to transmit and receive signals is disclosed. The connector device includes a female portion electrically coupled to the RF signal circuitry, with the female portion providing a plurality of ports for electrical coupling with the RF signal circuitry. A complementary male portion is also provided which is electrically coupled to the antennas, the male portion including a separate pin member connected to each antenna. Each pin member of the male portion is received within a corresponding one of the ports in the female portion as the male and female portions of the connector device are mated together. In this way, the RF signal circuitry and the antennas are electrically coupled. The antennas of the portable phone are integrated with a flip cover rotatably mounted to a phone base containing the RF circuitry, where the flip cover may be either fixedly or detachably secured to the phone base.

In accordance with a second aspect of the present invention, a device for selectively connecting the RF signal circuitry of a portable phone and the antennas integrated with a flip cover rotatably mounted to a phone base containing the RF signal circuitry or the antennas integrated with an external docking station is disclosed. This connector device includes a female portion having a plurality of ports therein which are electrically coupled to the RF signal circuitry. The female portion further includes: a housing mounted to the phone base with a plurality of openings extending therethrough; a dividing block switch having a plurality of spaced blade members; a plurality of coaxial cable connectors, wherein each coaxial cable connector is attached to one of the blade members of the dividing block switch at one end and one of the coaxial cables at a second end; a plurality of contact springs, wherein a first end of each contact spring is coupled with one of the coaxial cable connectors and a second end is located adjacent one of the housing openings; a spring carrier including a plurality of compartments, the spring carrier being configured to be slidingly engagable with the dividing block switch so that each compartment is located between a pair of the spaced blade members; and a plurality of spring connectors located in the spring carrier, each spring connector having a first end electrically coupled to the RF signal circuitry and a second end biased against one of the contact springs. A male portion of the connector device is positioned in the external docking station, the male portion including a separate pin member connected to each external docking station antenna. The pin members are positioned in the male portion so that they enter the female portion housing through the openings and contact the spring connector second ends when the female and male portions of the connector device are mated together. In this way, the external docking station antennas are coupled to and the flip cover antennas are decoupled from the RF signal circuitry when the main housing is positioned in the external docking station.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
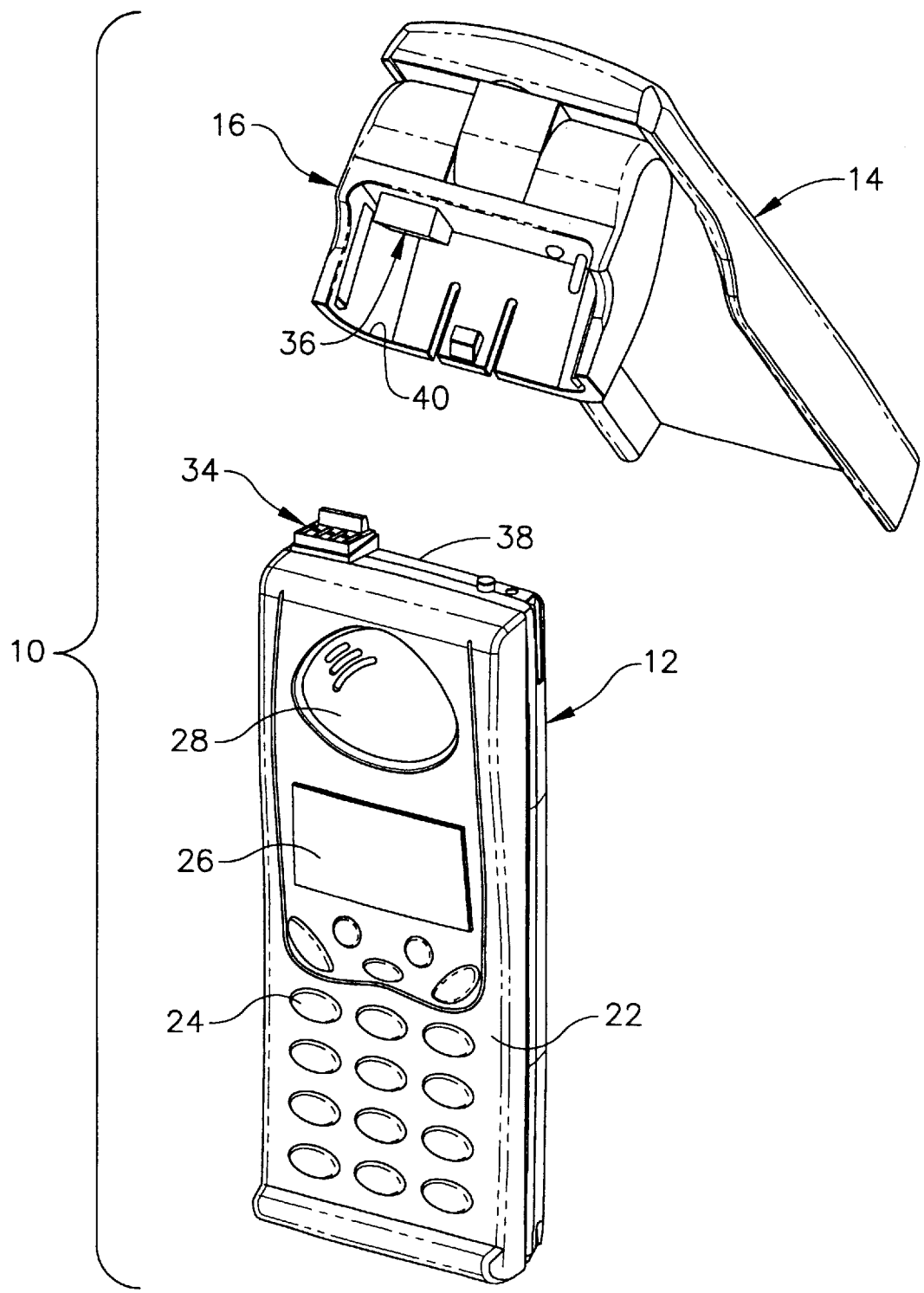
FIG. 1 is a perspective view of a handheld mobile phone including a connector of the present invention, where the flip cover is detached from the phone base portion to show the female portion of the connector being mounted on a top portion of the phone base and a male portion being mounted on the support bracket assembly.

Referring now to the drawing in detail, wherein identical numerals indicate the same elements throughout the figures, FIG. 1 depicts a handheld portable phone capable of operating in the dual modes of cellular and satellite communication and is indicated generally by the numeral 10. Portable phone 10, as shown in FIG. 1, has essentially the same configuration as that shown and described in a patent application entitled "Detachable Flip Cover Assembly for a Portable Phone," Ser. No. 08/586,434, which is also owned by the assignee of the present invention and is hereby incorporated by reference.

It will therefore be seen that portable phone 10 includes a main housing 12 and a flip cover 14 which are interconnected by means of a support bracket assembly indicated generally by the numeral 16. It will be noted in FIG. 1 that a top surface 22 of main housing 12 offers access to a keypad 24, a display 26, and a speaker 28. Also, while not shown, it will be understood that main housing 12 includes RF signal circuitry therein enabling portable phone 10 to communicate in both the cellular and satellite modes of communication, such as shown and described in a patent application entitled "Dual Mode Satellite/Cellular Terminal," Ser. No. 08/501,575, which is owned by the assignee of the present invention and hereby incorporated by reference.

Figure 2:
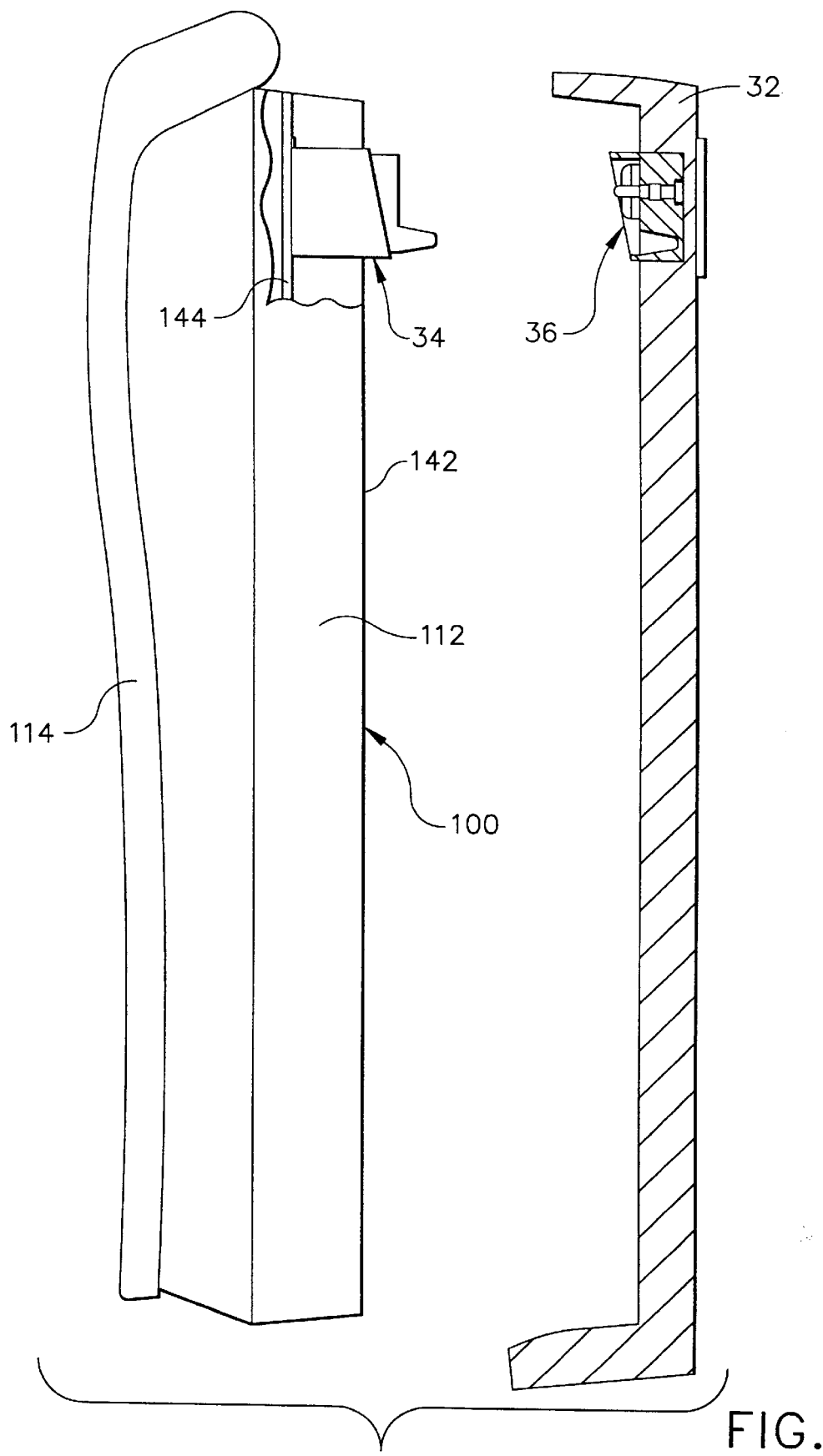
FIG. 2 is a side view of another handheld mobile phone including a connector of the present invention, where the flip cover is in the closed position and the phone base portion is spaced from an external docking station to show the female portion of the connector being mounted on a rear portion of the phone base and the male portion thereof being mounted within the docking station.

While flip cover 14 and support bracket assembly 16 are detachably mounted to main housing 12 of portable phone 10, as indicated by the exploded view in FIG. 1, an alternative portable phone embodiment 100 is depicted in FIG. 2. Portable phone 100 has essentially the same configuration as that shown and described in a patent application entitled "Antenna System for Dual Mode Satellite/Cellular Portable Phone," Ser. No. 08/586,433, which also is owned by the assignee of the present invention and is hereby incorporated by reference. As seen therein, the antennas for portable phone 100 are also integrated with a flip cover 114 which is rotatably mounted to a main housing 112 about two separate axes. However, unlike flip cover 14 in FIG. 1, flip cover 114 is not detachably secured to main housing 112.

In both FIG. 1 and FIG. 2, a device 30 in accordance with the present invention is provided for connecting the antennas integrated in flip covers 14 and 114, respectively, with the RF signal circuitry located in main housings 12 and 112. Moreover, as described in more detail herein, it will be seen that device 30 is configured to selectively connect the RF signal circuitry in portable phones 10 and 100 with the antennas positioned in their respective flip covers or with antennas integrated in an external docking station 32 (shown in FIG. 2 only) which is able to receive main housings 12 and 112 therein.

Figure 3:
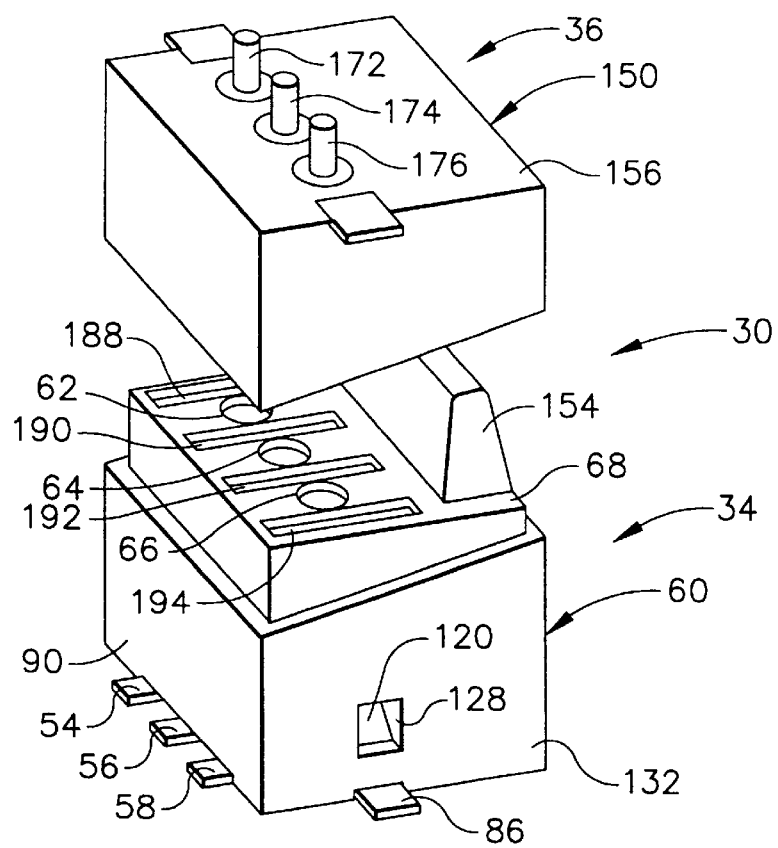
FIG. 3 is an exploded, top perspective view of the male and female portions of the connector depicted in FIGS. 1 and 2.
Figure 4:
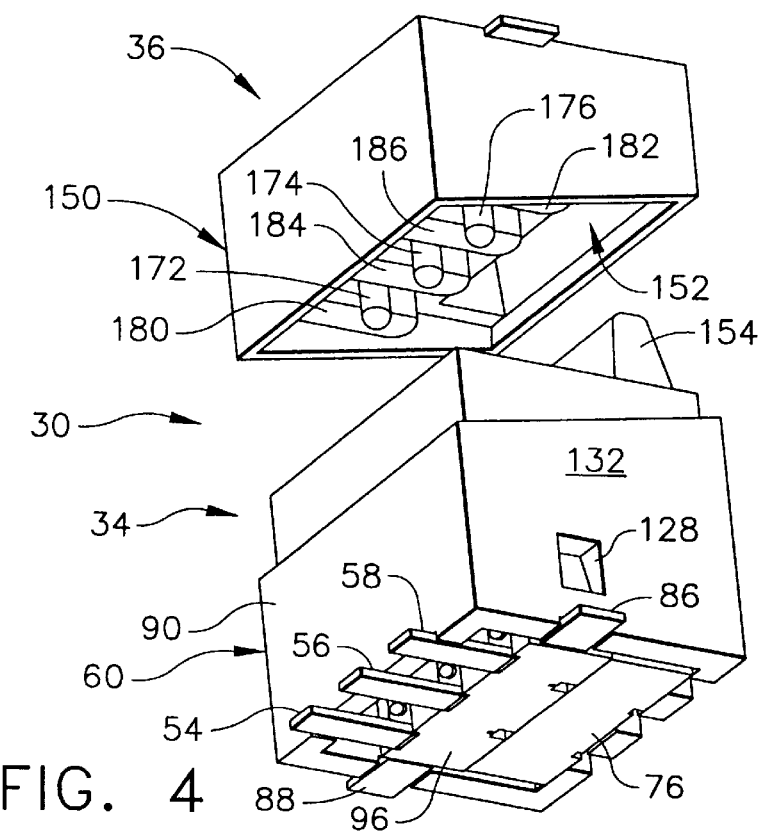
FIG. 4 is an exploded, bottom perspective view of the male and female portions of the connector depicted in FIGS. 1-3.

More specifically, FIGS. 3 and 4 depict device 30 as having a female portion 34 and a complementary male portion 36. It will be seen in FIG. 1 that female portion 34 of device 30 is mounted to and extending from a top portion 38 of main housing 12 and male portion 36 is positioned within a first slotted portion 40 of support bracket assembly 16. By contrast, FIG. 2 depicts female portion 34 of device 30 as being mounted to and extending from a rear portion 142 of main housing 112. Since flip cover 114 remains mounted to main housing 112 in this second embodiment, placing female portion 34 in this rear location provides better access for a male portion 36 positioned within external docking station 32. Unless otherwise indicated herein, though, it should be understood that the construction of device 30, and female and male portions 34 and 36 thereof, will remain consistent for both portable phones 10 and 100.

Figure 11:
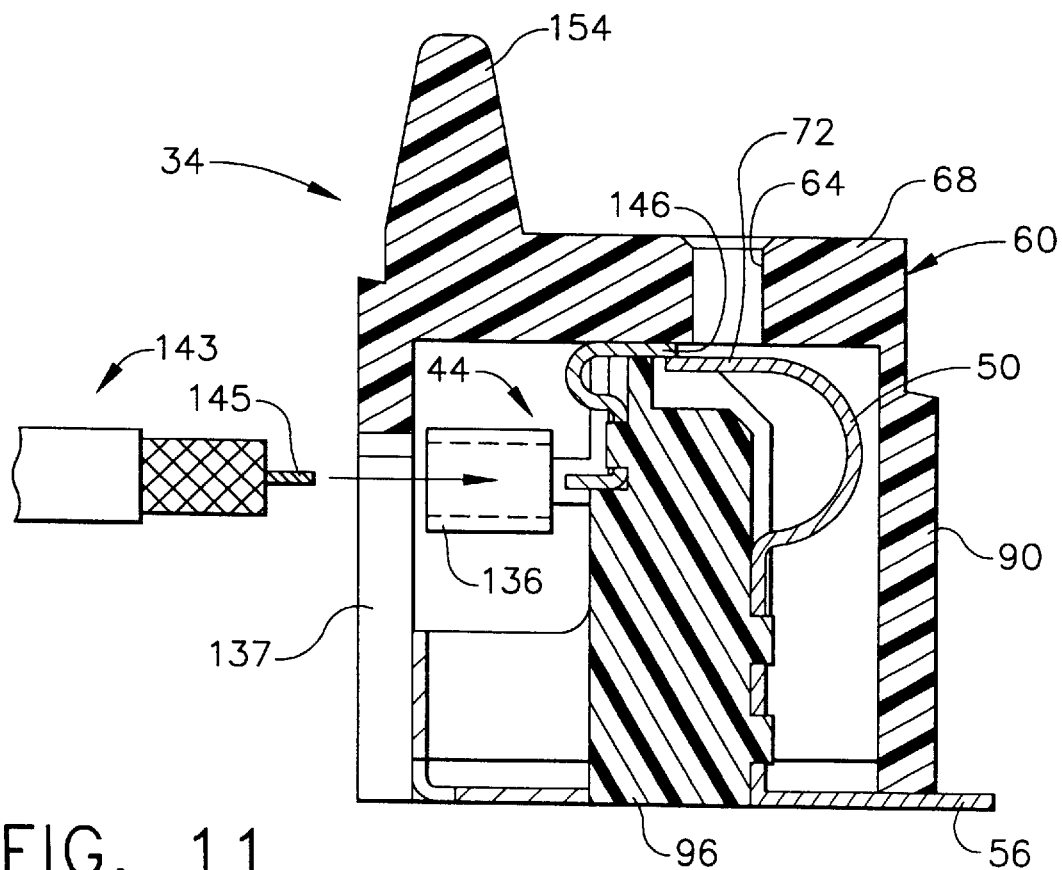
FIG. 11 is a cross-sectional view of the connector female portion depicted in FIGS. 3, 4 and 6.

With respect to both portable phone configurations, female portion 34 is electrically coupled to the RF signal circuitry located within main housings 12 and 112, respectively. In fact, as seen in FIG. 2, it is preferred that female portion 34 be connected directly to a printed circuit board 144 which contains the miscellaneous electrical components comprising the RF signal circuitry, thereby facilitating such electrical coupling. Female portion 34 includes a plurality of ports (one of which is identified by the numeral 44 in FIG. 11), which are defined as separate areas within female portion 34 that include several components for collectively providing electrical coupling to the RF signal circuitry, as delineated below. It will be understood that although three separate ports are provided with regard to female portion 34, any number may be provided. In this instance, three ports 42, 44, and 46 are included to provide for the three separate antenna elements preferably supplied in accordance with the above-identified patent applications (one antenna element each for transmitting and receiving signals in the satellite mode, as well as a separate antenna element for both transmitting and receiving in the cellular mode).

Spring connectors 48, 50, and 52 are utilized by female portion 34 to provide a direct connection to the RF signal circuitry at their respective first ends 54, 56, and 58. It will be noted that female portion 34 has a housing 60 with a plurality of openings 62, 64, and 66 formed in a top wall 68 (see FIG. 3). Openings 62, 64, and 66 are positioned so as to be substantially aligned with respective second ends 70, 72, and 74 of spring connectors 48, 50, and 52.

In order to better define ports 42, 44, and 46, a dividing block switch, identified generally by the numeral 76, is retained within female portion housing 60. Dividing block switch 76 includes a plurality of spaced blade members 78, 80, 82, and 84 which not only define the areas in which the components of ports 42, 44, and 46 are situated, but also provide some measure of shielding against RF interference therebetween by acting as ground for the RF signal circuitry. It will be noted that dividing block switch 76 preferably has a pair of feet 86 and 88 which extend laterally outwardly from blade members 78 and 84 in order to provide support to female portion 34. Side walls 130 and 132 each include a slot 131 and 133, respectively, in a bottom portion thereof which enable feet 86 and 88 to extend therefrom. Likewise, front wall 90 of female portion housing 60 has an extended slot 91, which enables spring connector first ends 54, 56 and 58 to extend thereunder and couple with the RF circuitry. A substantially U-shaped member 92 is used to connect blade members 78 and 84, and also includes an extension 94 which connects blade members 80 and 82 thereto. In this way, dividing block switch 76 is preferably maintained as a unitary structure.

Figure 8:
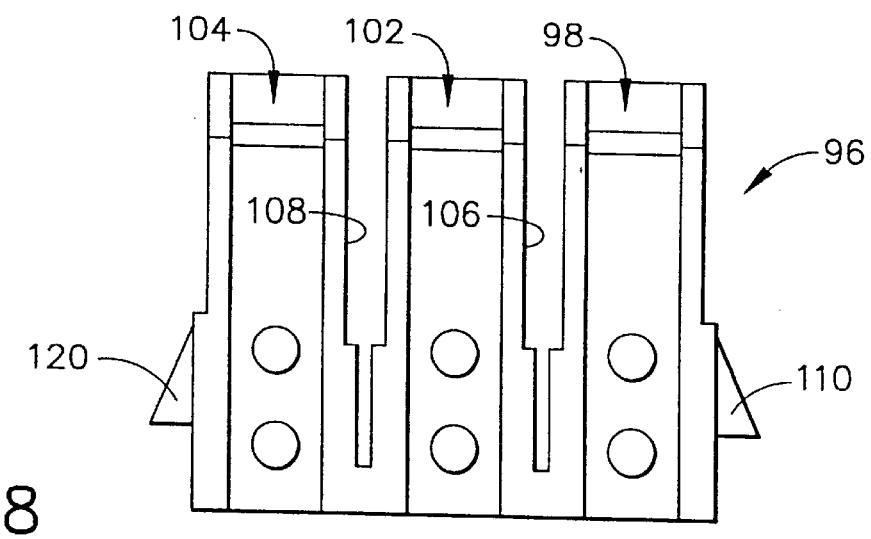
FIG. 8 is a rear view of the spring carrier depicted in FIG. 6.
Figure 9:
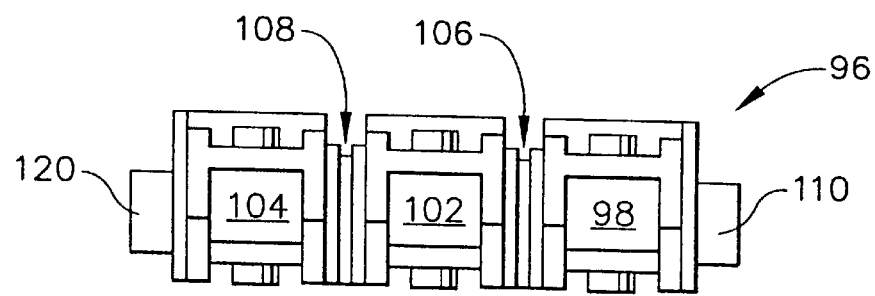
FIG. 9 is a top view of the spring carrier depicted in FIG. 8.

A spring carrier 96 is preferably provided having a plurality of compartments 98, 102, and 104 (see FIG. 8) to contain spring connectors 48, 50, and 52 and better maintain them in the desired position. Spring carrier 96 has a pair of staggered grooves 106 and 108 formed between compartments 98 and 102 and compartments 102 and 104, respectively, so that it is able to slidingly engage with dividing block switch 76 and specifically blade members 80 and 82 thereof. Detents 110 and 120 are formed on the outer side surfaces of spring carrier 96 in order to retain it to dividing block switch 76, where detents 110 and 120 fit into cut-out portions 122 and 124 formed in blade members 78 and 84. It will further be seen that a pair of corresponding cut-out portions 126 and 128 are formed in side walls 130 and 132 of female portion housing 60 so that detents 110 and 120 also preferably extend therein to also retain dividing block switch 76 and spring carrier 96 (and thus spring connectors 48, 50, and 52) within female portion housing 60.

Figure 6:
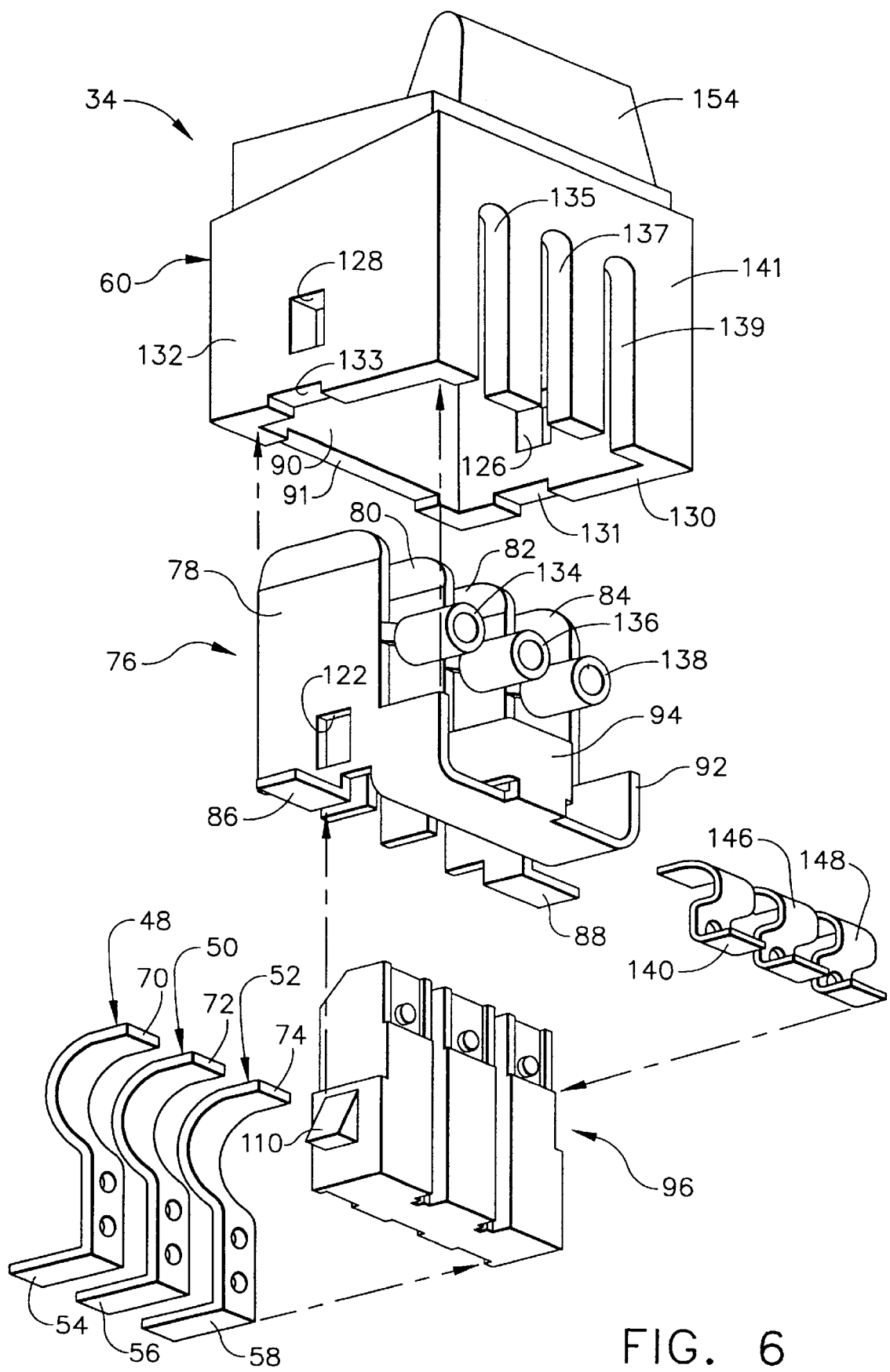
FIG. 6 is an exploded, perspective view of the connector female portion depicted in FIGS. 3 and 4.
Figure 7:
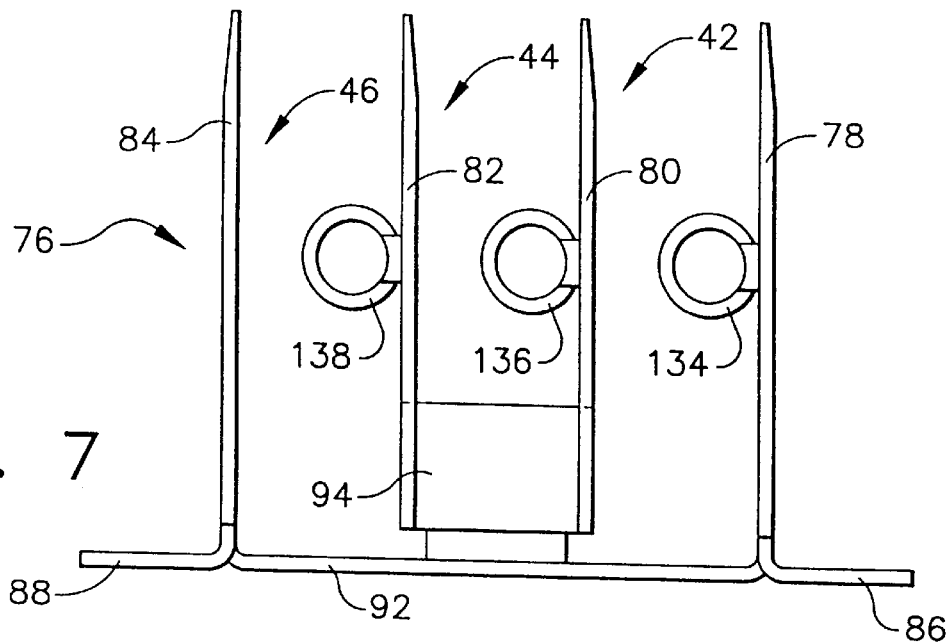
FIG. 7 is a rear view of the dividing block switch depicted in FIG. 6.

In the case of portable phone 10, female portion 34 need not contain any further items since the antennas in flip cover 14 and any antennas in an external docking station are connected to the RF signal circuitry via contact with first ends 54, 56, and 58 of spring connectors 48, 50, and 52 through openings 62, 64, and 66 in top wall 68 of female portion housing 60. However, with respect to portable phone 100, where the antenna elements in flip cover 114 are to always be connected to female portion 34 by coaxial cables (one of which being shown in FIG. 11 and identified generally by the numeral 143), female portion 34 also has a plurality of coaxial cable connectors 134, 136, and 138 which are preferably attached to blade members 78, 80, and 82 of dividing block switch 76 by soldering, welding, or the like. In order to accommodate coaxial cable connectors 134, 136, and 138, housing 60 of female portion 34 has a plurality of slots 135, 137, and 139 formed in a rear wall 141 thereof (as best seen in FIG. 6).

Further, a plurality of contact springs 140, 146, and 148 are positioned in female portion 34 so that they are connected to coaxial cable connectors 134, 136, and 138, respectively, at a first end so that a center conductor (see element 145 in FIG. 11) of each coaxial cable 143 may be electrically coupled to the RF signal circuitry. Spring connector second ends 70, 72, and 74 are preferably biased against the other end of contact springs 140, 146, and 148 so that the RF signal circuitry is electrically coupled with coaxial cable connectors 134, 136, and 138 in the normal case (where portable phone 100 is not in an external docking station 32 and coupled to a male portion 36 incorporated therein).

Figure 5:
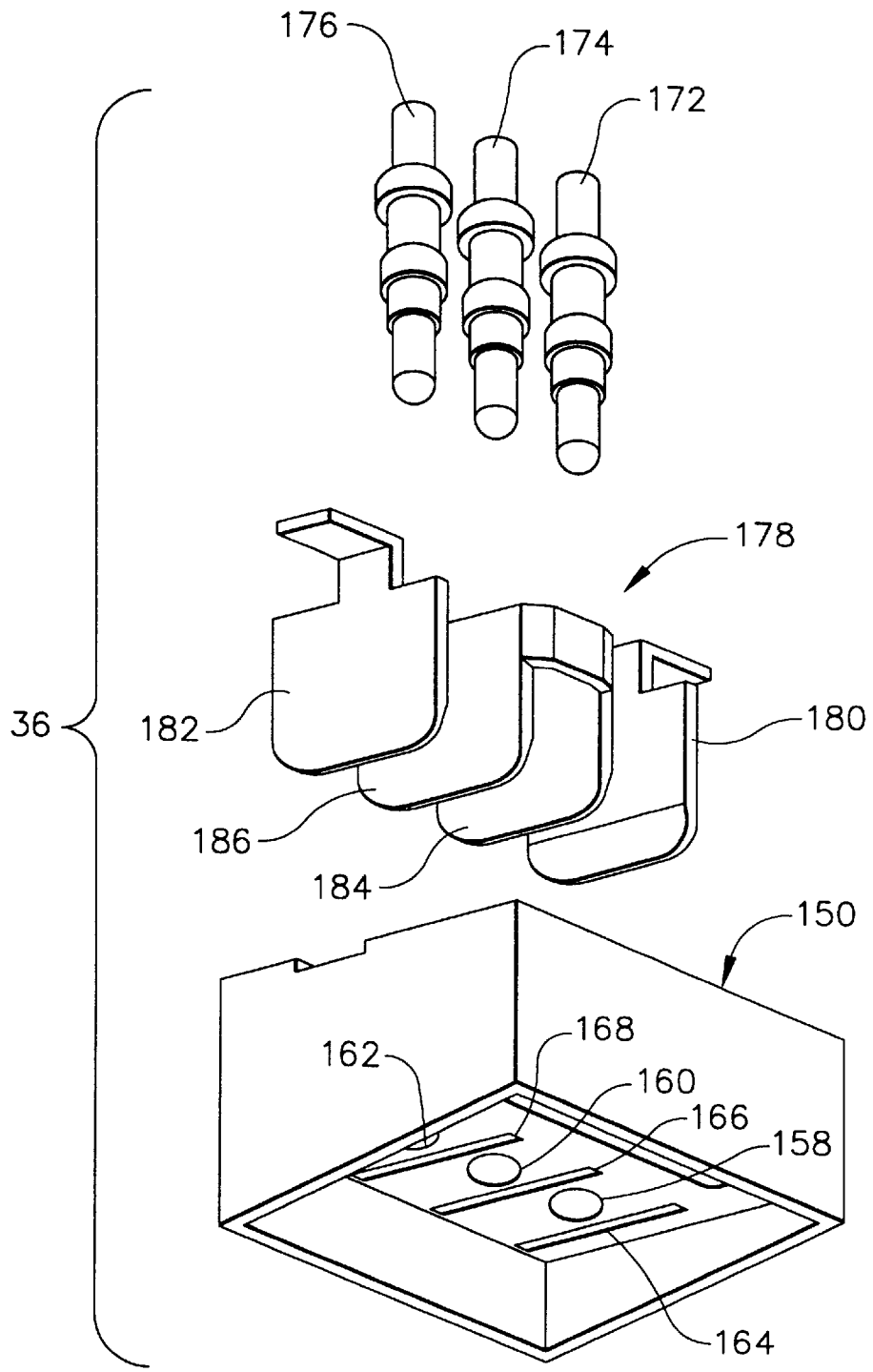
FIG. 5 is an exploded, perspective view of the connector male portion depicted in FIGS. 3 and 4.

As seen in FIGS. 3–5, male portion 36 of connector device 30 has a housing 150 which is matable with female portion housing 60. In particular, male portion housing 150 has incorporated therein an area 152 which conforms in shape to and is engagable with an insert 154 extending from top wall 68 of female portion housing 60. This provides a friction fit when female and male portions 34 and 36 are mated. Further, male portion housing 150 has formed in a top wall 156 thereof a plurality of openings 158, 160, and 162, as well as a plurality of slots 164, 166, 168, and 170 positioned to the side of each opening.

Figure 10:
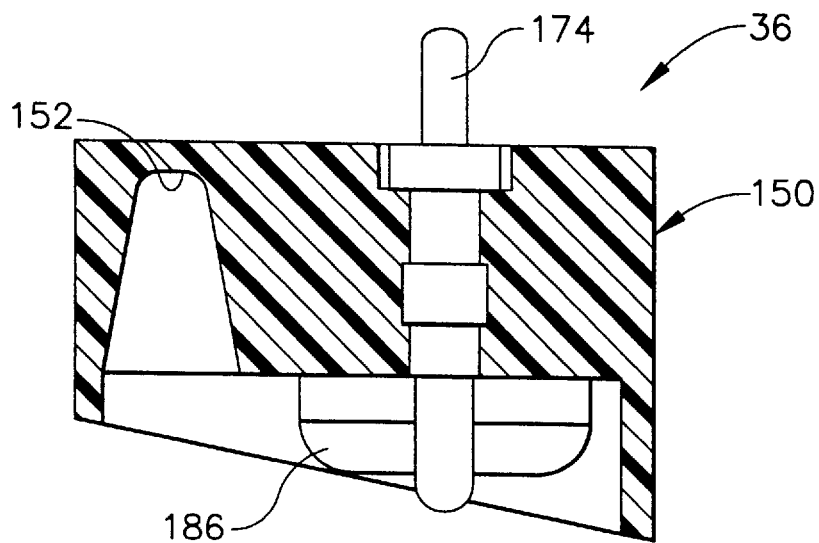
FIG. 10 is a cross-sectional view of the connector male portion depicted in FIGS. 3–5.

Openings 158, 160, and 162 are provided to receive and retain a plurality of corresponding pin members 172, 174, and 176, respectively, in a substantially fixed position. As best understood by referring to FIGS. 10 and 11, it will be seen that pin members 172, 174, and 176 are arranged so as to align with openings 62, 64, and 66 in top wall 68 of female portion housing 60. Accordingly, when female and male portions 34 and 36 are brought together in mating relation, pin members 172, 174, and 176 are able to extend through openings 62, 64, and 66 so that they engage spring connector second ends 70, 72, and 74.

It will be understood that pin members 172, 174, and 176 are connected to the antenna elements integrated with flip cover 14 by means of coaxial cables or the like in portable phone 10. Thus, when pin members 172, 174, and 176 contact spring connectors 48, 50, and 52, the antenna elements are thereby electrically coupled with the RF signal circuitry. It should be noted that an identical male portion 36 may also be mounted to a docking station (not shown in FIG. 1 with respect to portable phone 10) so that the pin members thereof are able to provide electrical coupling between the integrated antennas of such docking station and the RF signal circuitry of portable phone 10 when flip cover 14 and support bracket assembly 16 are detached from main housing 12 and main housing 12 is received in the docking station.

In the case of portable phone 100, where the antennas integrated with flip cover 114 remain coupled to female portion 34 via coaxial connectors 134, 136, and 138, pin members 172, 174, and 176 of male portion 36 not only contact spring connector second ends 70, 72, and 74 when female and male portions 34 and 36 are mated, but also cause them to be pushed out of contact with contact springs 140, 146, and 148. Therefore, the antennas of a docking station (e.g., as identified by the numeral 32 in FIG. 2) become electrically coupled to the RF signal circuitry in main housing 112 and the antennas integrated with flip cover 114 are correspondingly decoupled from the RF signal circuitry.

Male portion 36 also preferably includes a dividing block connector 178 having a plurality of spaced blade members, identified as first and second side blade members 180 and 182 and middle blade members 184 and 186, which are configured to be inserted through and retained in slots 164, 170, 166, and 168, respectively, of main portion housing 150. It will be understood that blade members 180, 182, 184, and 186 of dividing block connector 178 are brought into adjacent relation with blade members 78, 80, 82, and 84 of dividing block switch 76 by means of slots 188, 190, 192, and 194 formed in top wall 68 (on each side of openings 62, 64, and 66) of female portion housing 60. The respective blade members of dividing block connector 178 and dividing block switch 76 are then able to isolate the components comprising ports 42, 44, and 46 both from a physical and an RF interference standpoint.

In accordance with connector device 30 of the present invention, it is preferred that the size of the components in female and male portions 34 and 36 be such that they provide a stripline type of RF transmission medium. Also, it is preferred that connector device 30 have a controlled impedance of approximately 50 Ohms, which is standard at the input of antennas.

By constructing connector device 30 with a plurality of ports 42, 44, and 46 that provide access for electrical coupling with the RF signal circuitry of a portable phone, a substantial reduction in the overall space requirements on the main housing thereof are realized. This not only enables the use of larger center contact pins within a given space, but also provides greater reliability in coupling so that the amount of movement required of such center contact pins can be reduced. Accordingly, the overall mechanical and electrical performance of connector device 30 compared to prior art connector schemes is improved.

Further, it will be noted that connector device 30 is able to be utilized with a number of portable phone configurations, as exemplified by its application to those with a fixed and a detachable flip cover herein. Having shown and described the preferred embodiment of the present invention, further adaptations of the connector device can be accomplished by appropriate modifications by one of ordinary skill in the art without departing from the scope of the invention.

What is claimed is:

1. A device for connecting RF signal circuitry located in a base of a portable phone and a plurality of antennas integrated with a detachable flip cover rotatable mounted to said portable phone base by means of a support bracket assembly which are utilized to transmit and/or receive signals at designated frequencies, said device comprising:
    (a) a female portion electrically coupled to said RF signal circuitry, said female portion including a plurality of adjacently positioned ports for electrical coupling with said RF signal circuitry; and
    (b) a complementary male portion electrically coupled to said antennas, said male portion including a plurality of adjacently positioned pin members, wherein each of said pin members is connected to one of said antennas at a first end and received within a corresponding one of said ports at a second end as said male and female portions of said device are mated together, whereby said RF signal circuitry and said antennas are electrically coupled.

2. The device of claim 1, wherein said female portion thereof is mounted on a top portion of said phone base.

3. The device of claim 2, wherein said male portion thereof is positioned on said support bracket assembly so that said antennas integrated with said flip cover are electrically coupled with said RF signal circuitry.

4. The device of claim 2, wherein a separate male portion is located on an external docking station so that antennas integrated with said external docking station are electrically coupled with said RF signal circuitry when said flip cover is detached from said phone base and said phone base is positioned within said external docking station.

5. The device of claim 1, wherein said connector device provides an impedance of approximately 50 Ohms between said RF signal circuitry and said antennas.

6. A device for connecting RF signal circuitry of a portable phone and a plurality of antennas utilized to transmit and/or receive signals at designated frequencies, said device comprising:
    (a) a male portion electrically coupled to antennas, said male portion including a plurality of adjacently positioned pin members; and
    (b) a complementary female portion electrically coupled to said RF signal circuitry, said female portion further comprising:
        (1) a housing having a plurality of openings formed therein;
        (2) a plurality of adjacently positioned ports for electrical coupling with said RF signal circuitry, each port including a spring connector having a first end electrically coupled to said RF signal circuitry and a second end located adjacent to and aligned with one of said housing openings to permit access to said ports by pin members of said male portion;
        (3) a dividing block switch having a plurality of spaced blade members which form boundaries for each of said ports; and
        (4) a spring carrier including a plurality of compartments for containing said spring connectors, said spring carrier being configured to be slidingly engagable with said dividing block switch so that each compartment thereof is located between a pair of said spaced blade members;
    wherein each pin member is connected to one of said antennas at a first end and is received within a corresponding one of said ports at a second end as said male and female portions of said device are mated together, whereby said RF signal circuitry and said antennas are electrically coupled.

7. The device of claim 6, further comprising means for retaining said dividing block switch and said spring carrier within said female portion housing.

8. The device of claim 6, said female portion housing further comprising a plurality of slots formed through a top surface thereof, said slots being located to each side of said housing openings.

9. The device of claim 8, said male portion further comprising a housing retaining said pin members in a substantially fixed position, said male portion housing being matable with said female portion housing.

10. The device of claim 7, said male portion further comprising a dividing block connector having a plurality of spaced blade members retained to said male portion housing and located to each side of said pin members, wherein said spaced blade members of said dividing block connector are able to be inserted in said slots of said female portion housing.

11. The device of claim 6, each port of said female portion further comprising:
   (a) a coaxial cable connector attached to one of said blade members of said dividing block switch; and
   (b) a contact spring having a first end coupled with one of said coaxial cable connectors and a second end positioned adjacent to and in contact with one of said spring connectors.

12. The device of claim 11, said portable phone further comprising:
   (a) a phone base containing said RF signal circuitry;
   (b) a flip cover rotatably mounted to said phone base, said flip cover including said antennas integrated therewith; and
   (c) a plurality of coaxial cables having a first end coupled to one of said antennas and a second end coupled to one of said coaxial cable connectors;
wherein said flip cover antennas are electrically coupled to said RF signal circuitry.

13. The device of claim 12, wherein said female portion thereof is mounted on a rear portion of said phone base.

14. The device of claim 13, wherein said male portion thereof is located on an external docking station so that antennas integrated with said external docking station are electrically coupled with said RF signal circuitry when said phone base is positioned within said external docking station.

15. The device of claim 14, wherein said antennas integrated with said flip cover are decoupled from said RF signal circuitry.

16. The device of claim 15, wherein said pin members of said male portion cause said spring connector and said contact spring in each port to lose contact.

17. The device of claim 14, wherein said RF signal circuitry is selectively coupled to said flip cover antennas or said external docking station antennas.

18. A handheld portable phone, comprising:
   (a) a main housing;
   (b) RF signal circuitry located within said main housing for operating said portable phone in at least one designated communication mode;
   (c) a flip cover rotatably mounted to said main housing;
   (d) a plurality of antennas integrated with said flip cover for transmitting and receiving signals for each designated communication mode;
   (e) a connector device for electrically coupling said antennas and said RF signal circuitry, said connector device further comprising:
      (1) a female portion electrically coupled to said RF signal circuitry, said female portion including a housing mounted to said main housing, a plurality of spring connectors having a first end electrically coupled to said RF signal circuitry and a second end biased against a stop, and a plurality of openings in said female portion housing providing access to said spring connector second ends; and
      (2) a male portion electrically coupled to said antennas, said male portion including a separate pin member coupled to each said antenna;
wherein said pin members are positioned in said male portion so that they enter said female portion housing through said openings and contact said spring connector second ends when said female and male portions of said connector device are mated together.

19. A handheld portable phone, comprising:
   (a) a main housing;
   (b) RF signal circuitry located within said main housing for operating said portable phone in at least one designated communication mode;
   (c) a flip cover rotatably mounted to said main housing;
   (d) a plurality of antennas integrated with said flip cover for transmitting and receiving signals for each designated communication mode;
   (e) a coaxial cable connected to each of said antennas; and
   (f) a connector device for selectively coupling said flip cover antennas or antennas integrated with an external docking station with said RF signal circuitry, said connector device further comprising:
      (1) a female portion including:
         (a) a housing mounted to said main housing having a plurality of openings extending therethrough;
         (b) a dividing block switch having a plurality of spaced blade members;
         (c) a plurality of coaxial cable connectors, wherein each coaxial cable connector is attached to one of said blade members of said dividing block switch at one end and one of said coaxial cables at a second end;
         (d) a plurality of contact springs, wherein a first end of each contact spring is coupled with one of said coaxial cable connectors and a second end is located adjacent one of said openings;
         (e) a spring carrier including a plurality of compartments, said spring carrier being configured to be slidingly engagable with said dividing block switch so that each compartment is located between a pair of said spaced blade members; and
         (f) a spring connector located in each compartment of said spring carrier, each said spring connector having a first end electrically coupled to said RF signal circuitry and a second end biased against one of said contact springs; and
      (2) a male portion positioned in said external docking station, said male portion including a separate pin member connected to each said external docking station antenna;
wherein said pin members are positioned in said male portion so that they enter said female portion housing through said openings and contact said spring connector second ends when said female and male portions of said connector device are mated together, whereby said external docking station antennas are coupled to and said flip cover antennas are decoupled from said RF signal circuitry when said main housing is positioned in said external docking station.

* * * * *